(12) United States Patent
Bisson et al.

(10) Patent No.: US 11,392,544 B2
(45) Date of Patent: Jul. 19, 2022

(54) SYSTEM AND METHOD FOR LEVERAGING KEY-VALUE STORAGE TO EFFICIENTLY STORE DATA AND METADATA IN A DISTRIBUTED FILE SYSTEM

(71) Applicant: Samsung Electronics Co., Ltd., Suwon-si (KR)

(72) Inventors: Timothy C. Bisson, San Jose, CA (US); Anahita Shayesteh, Los Altos, CA (US); Changho Choi, San Jose, CA (US)

(73) Assignee: Samsung Electronics Co., Ltd.

( * ) Notice: Subject to any disclaimer, the term of this patent is extended or adjusted under 35 U.S.C. 154(b) by 653 days.

(21) Appl. No.: 15/934,747

(22) Filed: Mar. 23, 2018

(65) Prior Publication Data
US 2019/0243906 A1 Aug. 8, 2019

Related U.S. Application Data

(60) Provisional application No. 62/626,839, filed on Feb. 6, 2018.

(51) Int. Cl.
*G06F 3/06* (2006.01)
*G06F 16/13* (2019.01)
*G06F 16/16* (2019.01)
*G06F 16/182* (2019.01)

(52) U.S. Cl.
CPC .............. *G06F 16/13* (2019.01); *G06F 3/064* (2013.01); *G06F 3/0679* (2013.01); *G06F 16/16* (2019.01); *G06F 16/182* (2019.01)

(58) Field of Classification Search
CPC ........ G06F 16/13; G06F 16/182; G06F 16/16; G06F 3/064; G06F 3/0679; G06F 3/0608; G06F 3/0643; G06F 3/067
See application file for complete search history.

(56) References Cited

U.S. PATENT DOCUMENTS

| 2014/0230342 A1 | 8/2014 | Macioch et al. |
| 2015/0120695 A1* | 4/2015 | Vasu ................... G06F 16/2228 707/711 |
| 2015/0302111 A1 | 10/2015 | Yue et al. |
| 2016/0099810 A1 | 4/2016 | Li et al. |

(Continued)

FOREIGN PATENT DOCUMENTS

WO 2017167171 A1 10/2017

OTHER PUBLICATIONS

Wang, Ke; "Scalable Resource Management System Software for Extreme-Scale Distributed Systems"; Illinois Institute of Technology, Department of Computer Science, Chicago, Illinois; Jul. 2015, 289 pages.

(Continued)

*Primary Examiner* — Amresh Singh
(74) *Attorney, Agent, or Firm* — Innovation Counsel LLP

(57) ABSTRACT

A solid-state drive (SSD) includes: a plurality of data blocks; a plurality of flash channels and a plurality of ways to access the plurality of data blocks; and an SSD controller that configures a block size of the plurality of data blocks. A data file is stored in the SSD with one or more key-values pairs, and each key-value pair has a block identifier as a key and a block data as a value. A size of the data file is equal to the block size or a multiple of the block size.

19 Claims, 10 Drawing Sheets

(56) References Cited

U.S. PATENT DOCUMENTS

2017/0277477 A1* 9/2017 Xi ......................... G06F 3/067
2018/0357234 A1* 12/2018 De .................... G06F 16/24569

OTHER PUBLICATIONS

Zeng, Jiaan; "Resource Sharing for Multi-Tenant NOSQL Data Store in Cloud"; School of Informatics and Computing, Indiana University, Dec. 2015; 167 pages.
Wu et al., "An Efficient B-Tree Layer for Flash-Memory Storage Systems," Department of Computer Science and Information Engineering National Taiwan University, Taipei, Taiwan, pp. 1-20.

* cited by examiner

SYSTEM AND METHOD FOR LEVERAGING KEY-VALUE STORAGE TO EFFICIENTLY STORE DATA AND METADATA IN A DISTRIBUTED FILE SYSTEM

CROSS-REFERENCE TO RELATED APPLICATION(S)

This application claims the benefits of and priority to U.S. Provisional Patent Application Ser. No. 62/626,839 filed Feb. 6, 2018, the disclosure of which is incorporated herein by reference in its entirety.

TECHNICAL FIELD

The present disclosure relates generally to key-value storage devices, more particularly, to a system and method for leveraging key-value storage to efficiently store data and metadata in a distributed file system.

BACKGROUND

In a traditional data storage node, key-value mappings, such as a block identifier (ID) to data content, are typically stored using an existing file system on the data storage node. This occurs because the underlying storage device does not natively support a key-value interface required by the data storage node. As a result, an additional layer of software, typically a file system, is required to present the key-value interface. The addition of the file system introduces memory and processor overheads.

A file system residing between a data storage node and an actual data storage device forces the data storage device to incur additional inefficiencies, such as overprovisioning and higher write amplification and require more central processing unit (CPU) cycles to perform tasks such as garbage collection in a resource-limited device environment.

SUMMARY

According to one embodiment, a solid-state drive (SSD) includes: a plurality of data blocks; a plurality of flash channels and a plurality of ways to access the plurality of data blocks; and an SSD controller that configures a block size of the plurality of data blocks. A data file is stored in the SSD with one or more key-values pairs, and each key-value pair has a block identifier as a key and a block data as a value. A size of the data file is equal to the block size or a multiple of the block size.

According to another embodiment, a distributed data storage system includes: a client; a name node including a first key-value (KV) solid-state drive (SSD); and a data node including a second KV SSD, wherein the second KV SSD includes a plurality of data blocks, a plurality of flash channels and a plurality of ways to access the plurality of data blocks, and an SSD controller that configures a block size of the plurality of data blocks. The client sends a create file request including a file identifier to store a data file to the name node and send an allocate command to the name node to allocate one or more data blocks of the plurality of data blocks associated with the data file. The name node returns a block identifier of the one or more data blocks and a data node identifier of the data node that is assigned to store the one or more data blocks to the client. The client sends a block store command to the data node to store the one or more data blocks. The second KV SSD stores the one or more data blocks as key-values pairs, and at least one key-value pair has the block identifier as a key and a block data as a value. A size of the data file is equal to the block size or a multiple of the block size.

According to yet another embodiment, a method includes: sending a create file request from a client to a name node, wherein the create file request includes a file identifier to store a data file; storing the file identifier as a key-value pair in a first key-value (KV) solid-state drive (SSD) of the name node, wherein the file identifier is stored in the key-value as a key, and a value associated with the key is empty; sending an allocate command from the client to the name node to allocate one or more data blocks associated with the data file; assigning, at the name node, a block identifier to at least one of the one or more data blocks and assigning a data node to store the one or more data blocks; returning the block identifier and a data node identifier of the data node from the name node to the client; sending a write block request from the client to the data node, wherein the write block request includes the block identifier and content; and saving the one or more data blocks in a second KV SSD of the data node as key-value pairs. The second KV SSD of the data node includes one or more data blocks having a block size. At least one key-value pair has a block identifier as a key and a block data as a value. A size of the data file is equal to the block size or a multiple of the block size.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1A:
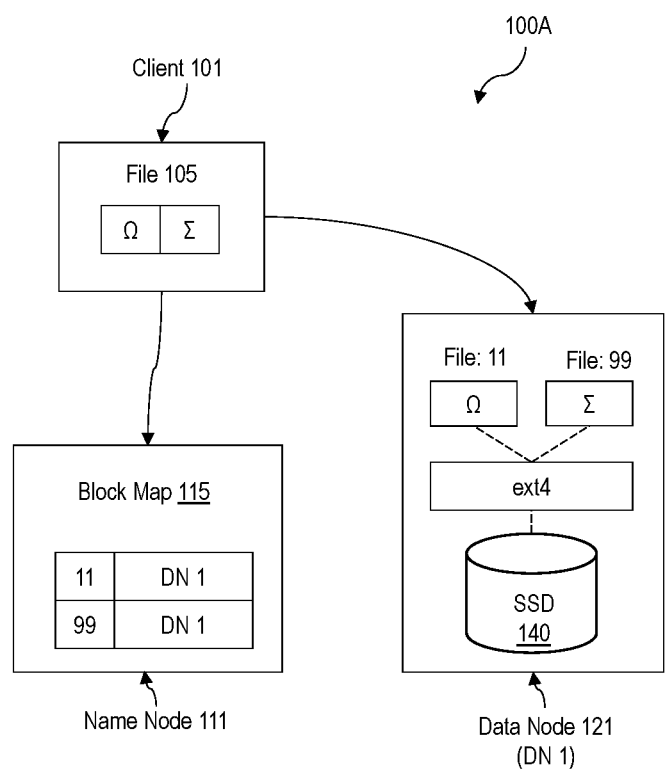
FIG. 1A shows a block diagram of a prior art distributed data storage system.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for leveraging key-value storage to efficiently store data and metadata in a distributed file system. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a system and method that addresses inefficiencies that are incurred by distributed file systems, such as, Hadoop Distributed File System (HDFS). The present system and method eliminates a need for a key-value file system that uses a file name as a block identifier and the file's data content (or a portion thereof) as a value, by directly storing data in a data storage device. Such a data storage device that can directly store data in key-value pairs is herein referred to a key-value (KV) solid-state drive (SSD), in short KV SSD. The KV SSD supports the key-value storage with a block-identifier as a key and data as a value. The present system and method can provide an efficient and simplified key-value data storage system including KV SSDs that can directly store data in one or more KV SSDs as key/value pairs. As a result, the present key-value data storage system can consume less energy and resources while providing a faster, simpler, and scalable data storage solution.

According to one embodiment, the KV SSD can implement a file system for storing data in key-value pairs in conjunction with a data storage node. Using one or more KV SSDs that can directly store key-value data, the present key-value data storage system can eliminate a file system in the data storage node. The data storage node can pass down information about its behavior to the KV SSD to optimize the internal data structures and resources of the KV SSD to accommodate a workload specified by the data storage node. In addition, an in-memory mapping table can be offloaded to the KV SSD to provide persistent data using a key-value interface between the data storage node and the KV SSD.

According to one embodiment, the present key-value data storage system can support existing file systems such as the HDFS. In particular, a file system that is optimized for large data blocks can be benefited by the present key-value data storage system. For example, the metadata (or a hash table) of the KV SSD is amortized with a large block size, for example, 10-100 MB.

A distributed file system such as HDFS has immutable data blocks that do not have to be moved around because the value for a key does not change, thus minimizing an internal write amplification factor (WAF) for data and metadata that is stored in the KV SSD. Additionally, the present key-value data storage system can reduce the CPU overhead associated with updating hash-table values.

The present key-value data storage system has a simplified flash translation layer (FTL) while improving performance and resource utilization. When a KV SSD is used with an immutable distributed storage system such as HDFS, the metadata overhead can be reduced. This is because in such a distributed file system, the content of a key cannot change, thus a KV SSD that stores a key/value pair never has to mark the value as old and point the key to a new value content on the flash media in the KV SSD. In other words, KV SSDs do not need to support overwrites. Additionally, with a distributed file system such as HDFS, blocks are of a fixed size, thus the KV SSD does not have to handle dynamically sized values, making management of the value locations simpler. For example, one can use a direct indexing-based data structure when all the blocks are of a fixed size. With these simplifications in the distributed file system, the FTL management of the key/value tuples can be simplified.

A distributed file system may keep the metadata in a memory of a single data storage node, thus limits their scalability. The present key-value data storage system can eliminate memory restrictions on managing metadata that may be required by other distributed file systems.

The present key-value data storage system can achieve high throughput that is not latency-oriented. Since the HDFS has such large block sizes, along with datasets that can exceed the memory capacity, a page-cache may not improve the data storage and management performance drastically. Therefore, even if the KV-SSD is deficient of a page-cache support, the KV SSD would not deteriorate the performance in a KV-enabled data node.

The centralized cache management feature of the HDFS provides a mechanism to explicitly tell a data node to cache certain blocks off-heap. This feature can be implemented in the KV-enabled data node by allowing it to still reap the benefits of a memory-based cache without having to make policy decisions to determine which blocks to cache.

The present key-value data storage system enables high parallelism in reads and write operations. Since the latency of each data block is of less importance, and the HDFS exposes a high degree of parallelism by reading/writing a large number of data blocks, there is no need to stripe a command (e.g., a read command, a write command) and send it to many channels on the KV SSD. Each data block can be directly written and read to one channel or one chip/die of the KV SSD to provide a throughput by taking advantage of the inherent parallelism. This can also simplify a FTL of the KV SSD and the complexity of the look-up process. The parallelism can also be applied to multiple channels or chips/dies according to the context of an erase block of the KV SSD. In turn, this can minimize or eliminate SSD overprovisioning by mapping the SSD block/page size to the block size of the distributed file system (e.g., HDFS). As a result, the present key-value data storage system can increase the throughput with a device erase block aligned to the fixed block size that is issued to the KV SSD, as the aligned erase block and the data size would require less synchronization across flash channels. The memory in the metadata node is no longer a bottleneck in the distributed storage system by offloading metadata maps to the KV SSD.

FIG. 1A shows a block diagram of a prior art distributed data storage system. A client application 101 has a file 105 to store in a data node 121 in a distributed data storage system 100A. The file 105 includes two data blocks, namely, Ω and Σ. After writing the file 105 to the data node 121, the client 101 stores the metadata associated with the file 105 in a block map 115 of a name node (or metadata node) 111. In the context of HDFS, the name node 111 is referred to as a master, and the data node 121 is referred to as a slave. The master may store the metadata of the files of the entire HDFS in a HDFS directory structure. Although some of the examples described below refer to HDFS, it is understood that other file systems optimized for a large amount of data can be used without deviating from the scope of the present disclosure.

The name node 111 maintains the block map 115 including the mapping information of the file 105 including block identifiers and the data node 121 that stores the blocks included in the file 105. In the present example, the blocks Ω and Σ have block identifiers "11" and "99," respectively. When the client 101 needs to access the file 105 (or the data blocks Ω and Σ), the client 101 communicates with the name node 111 to identify blocks associated with the file 105 and the data node 121 (DN 1) to access the file 105 (or the data blocks) based on the associative information stored in the block map 115.

The data node 121 includes a local file system (e.g., Linux's ext4 file system) with a directory structure to store each of the blocks as a file in a directory. The file name may be a unique block identifier ("11" or "99") corresponding to the respective block of the file 105, and the file's content is the block data. Because the blocks need to be stored as files, the data node 121 needs an additional layer of software (e.g., the local ext4 file system), an additional memory (e.g., dentry cache of Linux), and a CPU processing (e.g., portable Operating System Interface (POSIX) and file system-specific command processing) that translate key-value to file system on block, and file system overhead including metadata management. The controller logic of the SSD 140 needs to execute additional processes to maintain consistency of the block map 115. The HDFS block size may be unaligned with internal SSD page/block mappings. This can increase the internal WAF of the SSD and an over-provisioned space, resulting in more frequent garbage collection and an increase in the total cost of ownership (TCO).

Figure 1B:
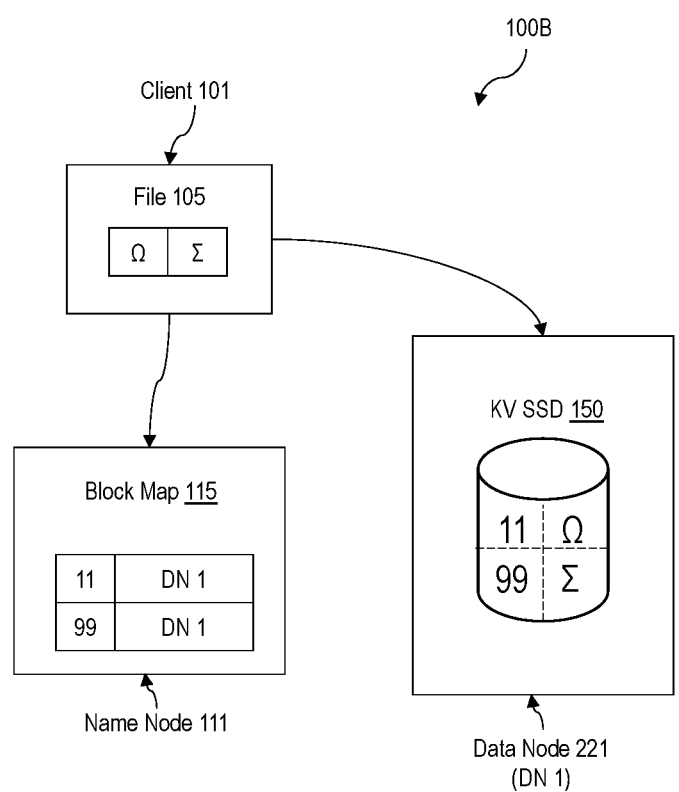
FIG. 1B shows a block diagram of an example distributed data storage system including a key-value storage device, according to one embodiment.

FIG. 1B shows a block diagram of an example distributed data storage system including a key-value storage device, according to one embodiment. The client application 101 stores the file 105 in a data node 221 in a distributed data storage system 100B. For example, the distributed data storage system 100B is a HDFS. The data node 221 including a key-value SSD 150 can directly store the data blocks Ω and Σ. Contrary to the data node 121 including a conventional SSD 140, the data node 221 does not require a local file system such as the ext4 because the data blocks of the file 105 are directly stored in the KV SSD 150 as key-value pairs.

The KV SSD 150 provides an interface for the data node 221 to communicate with the client application 101 that enables direct storage of data blocks as key-value pairs. Therefore, the data node 221 does not require a local file system layer, hence may not incur memory and CPU overheads of the conventional data node 121 of FIG. 1A.

According to one embodiment, the distributed data storage system 100B allows the client application 101 and the data node 221 to exchange information therebetween. This process is referred to as a registration process or a configuration process. During the registration process, the data node 221 may inform the client application 101 that it has one or more KV SSDs that can store the data blocks as key-value pairs. After the registration process is complete, the client application 101 knows that it can issue KV SSD-specific I/O device commands (e.g., /dev/kvssd1, where kvssd1 is the id of the data node 221) to the KV SSD 150 included in the data node 221. This simplifies the I/O path between the client application 101 and the data node 221. Rather than relying on a local file system to create and write data blocks to files, the data node 221 can issue a "put" command to store each data block as a key-value pair. Reading the stored key-value pair in the KV SSD 150 is similar; the data node 221 can directly issue a "get" command to the KV SSD 150 to retrieve the data block associate with a key rather than going through the file system interface to retrieve the data block. A delete process may follow a similar process.

During the registration process, the KV SSD 150 can be provided with information regarding the behaviors of the distributed data storage system 100B. The flash translation layer (FTL) of the KV SSD 150 can be optimized specifically for the distributed data storage system 100B based on the behaviors of the distributed data storage system 100B.

The SSD controller of the KV SSD 150 can write and read data in stripes across different memory chips (e.g., NAND chips) to speed up write and read operations. The distributed data storage system 100B (e.g., HDFS) may send many I/O requests in parallel and can tolerate long latencies as long as the throughput is high. This parallelism can reduce the latency by adding complexity to the SSD controller. According to one embodiment, the FTL of the KV SSD 150 can be optimized to read and write large blocks to a single channel based on the information of the distributed data storage system 100B. In this case, the FTL of the KV SSD 150 does not allow striping of the data across multiple chips over multiple channels but can execute simultaneous read and write operations in parallel to achieve the high throughput.

Distributed file systems such as HDFS can be optimized for data-centric and data-intensive applications that read the stored data frequently. In this case, data read operations occur much more frequently than data write operations. Some of these distributed file systems provide write-once semantics and use large block sizes. In contrast, the KV SSD 150 can support dynamic block sizes and frequent updates to the data blocks.

According to another embodiment, the KV SSD 150 can be optimized to incur no garbage collection that may be otherwise required for employing an internal file system such as the SSD 140 of FIG. 1A. Garbage collection is a process to move valid pages from a block that includes stale pages so the block can be erases and re-written. It is an expensive process that can contribute to write amplification, I/O indeterminism, and drive's wear leveling. Once optimized, the FTL of the KV SSD 150 can use the same granularity for write and erase operations. When a block is deleted, the block can be immediately marked for erase, thus eliminating a need for garbage collection. The optimized FTL of the KV SSD 150 can improve performance and durability while eliminating garbage collection and simplifying the FTL.

According to one embodiment, the KV SSD 150 supports dynamic page and block sizes. For example, the KV SSD 150 can adjust a block size of a block to be stored therein based on the HDFS configuration. For instance, during the configuration, the distributed data storage system 100B can inform the KV SSD 150 that only aligned fixed-size write operations will be issued to the KV SSD 150, and the KV SSD 150 configures its block size accordingly. Alternatively, the KV SSD 150 can expose its erase block size (or possible erase block sizes) and require the distributed data storage system 100B to configure its block size accordingly. In either case, the block size in the KV SSD 150 and the distributed data storage system 100B are configured with regards to each other.

According to one embodiment, the distributed data storage system 100B may configure the KV SSD 150 to allow or disallow block updates. For example, the distributed data storage system 100B may pass an additional parameter, herein referred to as an update flag, to the KV SSD 150. Using the update flag, the SSD controller of the KV SSD 150 can configure itself to provision additional flash block(s) and thread(s) to handle garbage collection that is associated with block update requests received from the client application 101. By disallowing block updates (e.g., update flag=false), the distributed data storage system 100B can achieve massive increase of the throughput as a result of parallelism across the different flash channels or dies. When each new write is used with a new key, the KV SSD 150 does not have to perform synchronization across channels or dies to verify that the block being written is an overwrite. In this case, the data node 221 can set the block update flag as false.

Figures 2A, 2B:
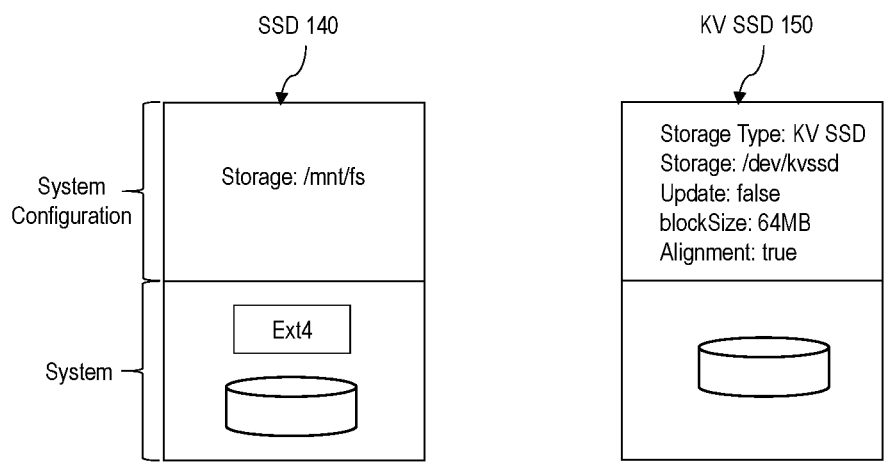
FIG. 2A shows system configuration of an example SSD.
FIG. 2B shows an example system configuration of a key-value SSD, according to one embodiment.

FIG. 2A shows system configuration of an example SSD. Referring to FIG. 1A, the distributed data storage system 100A configures the SSD 140 by mounting its local file system (e.g., ext4 of Linux) as "/mnt/fs." The files stored in the SSD 140 are accessible by the mounted file system of the SSD 140.

FIG. 2B shows an example system configuration of a key-value SSD, according to one embodiment. Referring to FIG. 1B, the distributed data storage system 100B configures the KV SSD 150 based on the information of the KV SSD 150 received during the registration process. For example, the distributed data storage system 100B can configure the storage type of the KV SSD 150 as a key-value SSD (KV SSD) and set the I/O path of the KV SSD 150 as "dev/kvssd." The KV SSD 150 can be further configured to set the block update flag as false, the block size as 64 MB, and the alignment flag as false.

When the KV SSD 150 is configured to disable cross-channel I/O operations by setting its erase block size and the data size of the distributed data storage system 100B to be equal and aligned, the distributed data storage system 100B perform achieve lock-less I/O operations across all the channels or dies in the KV SSD 150. For example, the KV SSD 150 uses a simple hash function (e.g., address mod 10) to determine a channel among all possible channels that an I/O should be routed to. In this case, all I/O operations for a given address will consistently route to the same flash channel. In a case where a channel is executed by a serial processing unit, all I/O operations routed to that channel are ordered without requiring any cross-channel locking. As a result, the distributed data storage system 100B can achieve complete parallelism across the I/O threads without requiring synchronization.

Figure 3:
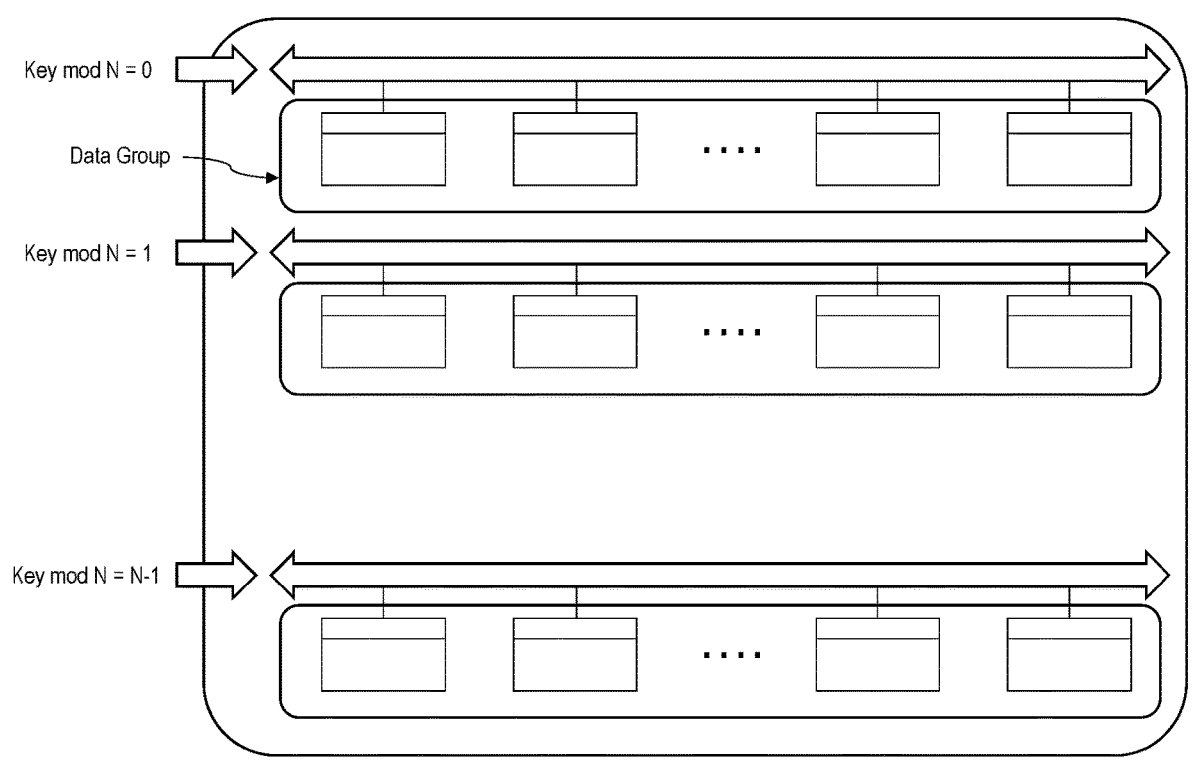
FIG. 3 shows an example SSD channel and die architecture achieving channel-level parallelism, according to one embodiment.

The present KV SSD can achieve parallelism depending on how the KV SSD handles erase blocks as a garbage collection unit. FIG. 3 shows an example SSD channel and die architecture achieving channel-level parallelism, according to one embodiment. The KV SSD can leverage channel-level parallelism to improve its I/O performance. In the present example, the KV SSD has N channels and M ways, where N and M are integers equal to or greater than 1. The data size of the distributed file system (e.g., HDFS) is set to be equal to a block size of the KV SSD or the multiplicity of the block size. The block size of the KV SSD is determined by the multiplication of the size of an erase unit in a chip (or die) and the number of ways inside the KV SSD, i.e., block size=size of erase unit*number of ways. The data can be striped across the chips in the same channel. For example, the KV SSD has an erase unit size of 6 MB and 8 ways, and the data size of the distributed file system is set to be 48 MB to fit in the data group of the KV SSD. Garbage collection does not occur in the channel-level parallelism as the deletion of a 48 MB data results in the resetting of the 8 complete erase blocks in the same channel. However, the channel-level parallelism does not exploit the potential parallelism that multiple channels can offer.

Figure 4:
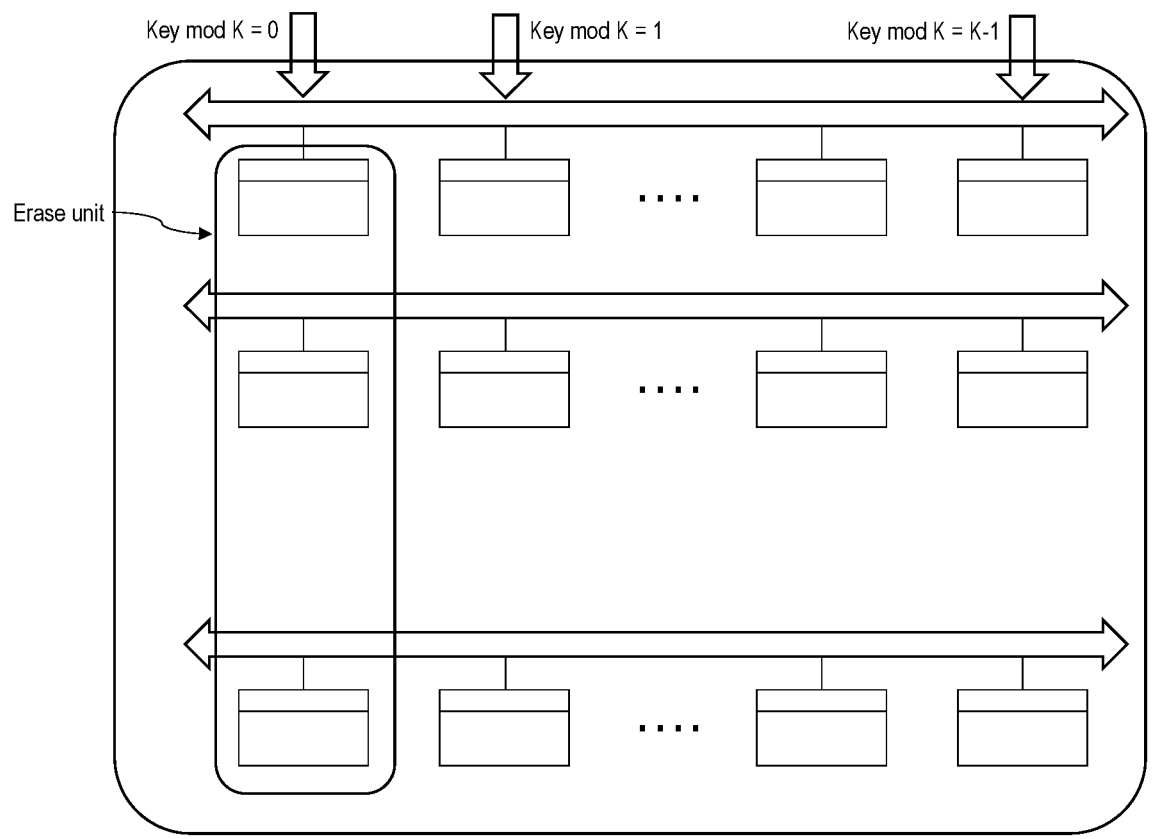
FIG. 4 shows an example SSD channel and die architecture achieving way-level parallelism, according to one embodiment.

FIG. 4 shows an example SSD channel and die architecture achieving way-level parallelism, according to one embodiment. The KV SSD can leverage way-level parallelism to improve its I/O performance. In this case, the data size of the distributed file system (e.g., HDFS) is set to be equal to a block size of the KV SSD or the multiplicity of the block size. The block size of the KV SSD is determined by the multiplication of the size of an erase unit and the number of channels, i.e., block size=size of erase unit*number of channels. The garbage collection unit and the data size are the multiplication of the block size. The data can be striped across chips in the same way. The data striping can occur across all of the channels enabling a full use of the channel parallelism.

Figure 5:
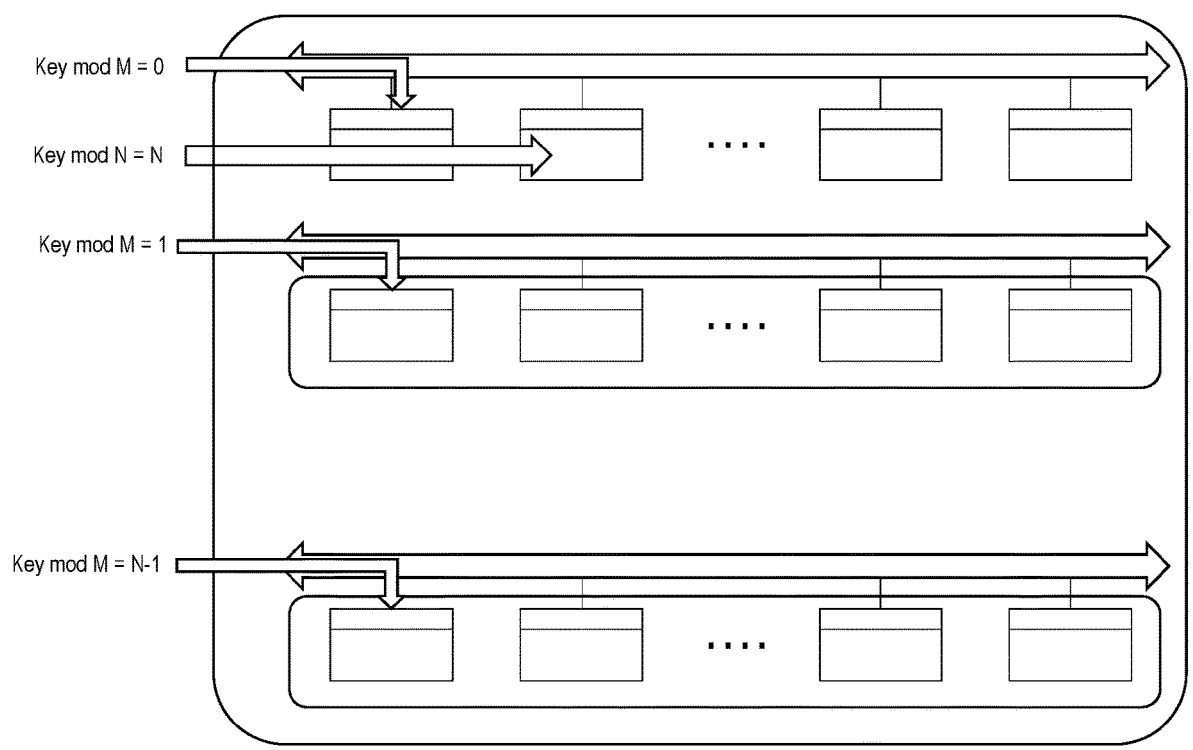
FIG. 5 shows an example SSD channel and die architecture achieving die/chip-level parallelism, according to one embodiment.

FIG. 5 shows an example SSD channel and die architecture achieving die/chip-level parallelism, according to one embodiment. In the present example, the number of SSD channels is N, and the number of dies is M that is greater than N. The die/chip-level parallelism provides the highest parallelism across the channels and chips in the KV SSD. In this case, the block size is equal to the erase unit, and garbage collection occurs in the erase unit. The data size is aligned to the multiple of erase units. The die/chip-level parallelism is similar to consistent hashing with virtual nodes. In this case, each virtual node corresponds to an erase block unit, and the physical node corresponds to the channel.

Distributed file systems such as HDFS maintains metadata to manage the location of data. For example, each file maintains a list of all blocks that comprises the file. A replicated distributed storage system maintains a separate map that lists the locations of all the nodes that store a given block (or the file). In some distributed data storage systems, these mapping tables are kept in a memory of a single node limiting the scalability of the distributed data storage system. For example, when the metadata node that stores these mapping tables does not have enough memory to store additional mapping data, no blocks or files can be added. A file system may be used on top of the data storage device to store these mapping, but it introduces an additional overhead.

The present KV SSD can directly store data in key-value pairs by persistently keeping the mapping of the file to a block list, and the mapping of the block to a node list without requiring a local file system. As a result, the node responsible for storing metadata is not limited by its memory capacity and does not incur an overhead of having an additional file system. Because these mapping information is directly stored on the KV SSD, it can be stored in a single mapping table as being indexed by the file. This enables a single lookup in the KV SSD to retrieve all the data blocks. The single mapping table makes the metadata more scalable (only one mapping table) and more efficient (one lookup).

The process of reading a file stored in the KV SSD is similar to a process of using a normal hash map or a similar data structure. The data structure can be a library that directly links to the KV SSD. For example, a client application issues a file retrieve operation to read a file using a file ID. The metadata node returns a block list of the file in the form of a blob, and the metadata node can map into the format to which the block list was originally written. The block list also contains a node list where each of the blocks in the block list is stored. The metadata node can then pass the list of the blocks and associated nodes back to the client application to issue reads for the blocks. In this scheme, the metadata node still needs to store the mapping tables in its memory for each lookup to pass the list back to the client application; however, the metadata node does not need to keep all mapping information in its memory. For example, a cache of recently read files can provide a trade-off between scalability and efficiency.

Figures 6A, 6B:
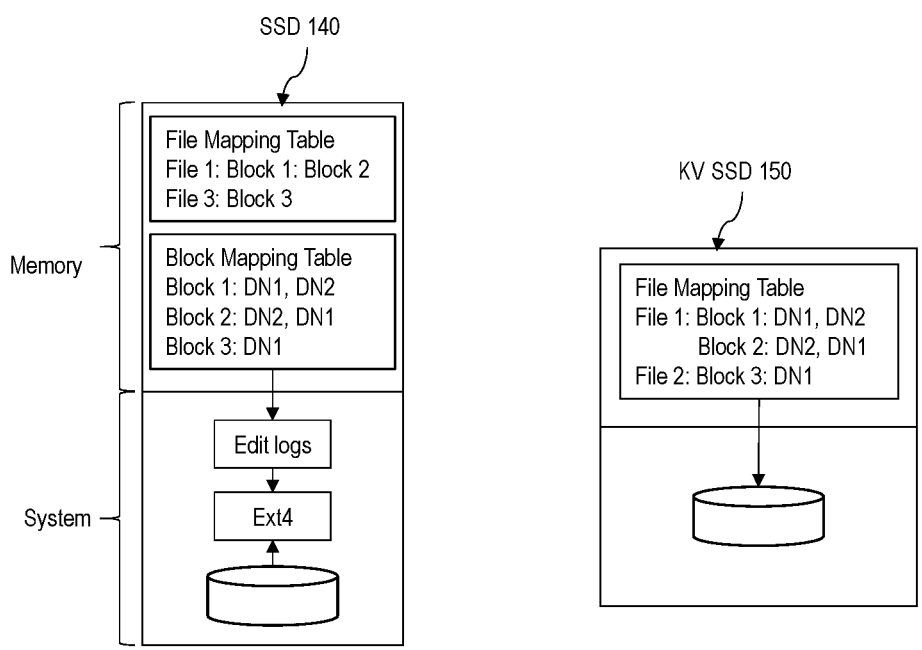
FIG. 6A shows an example mapping scheme of an example SSD.
FIG. 6B shows an example mapping scheme of a KV SSD, according to one embodiment.

FIG. 6A shows an example mapping scheme of an example SSD, for example, the SSD 140 of FIGS. 1A and 1B. An edit log refers to a log of all the metadata operations performed on the File and Mapping table. These edit logs are persisted to disk. This is necessary because the file and block mapping table are in the memory only; if a name node crashes, it rebuilds the file and block mapping table in the memory by reading the edit logs from storage. FIG. 6B shows an example mapping scheme of a KV SSD, for example, the KV SSD 150 of FIGS. 1B and 2B, according to one embodiment. The SSD 140 stores a file mapping table and a block mapping table in its memory. Using these mapping information, a client application can retrieve the data blocks associated with a file. Meanwhile, the KV SSD 150 stores the file mapping table including a single mapping of the block list and node list.

Figure 7:
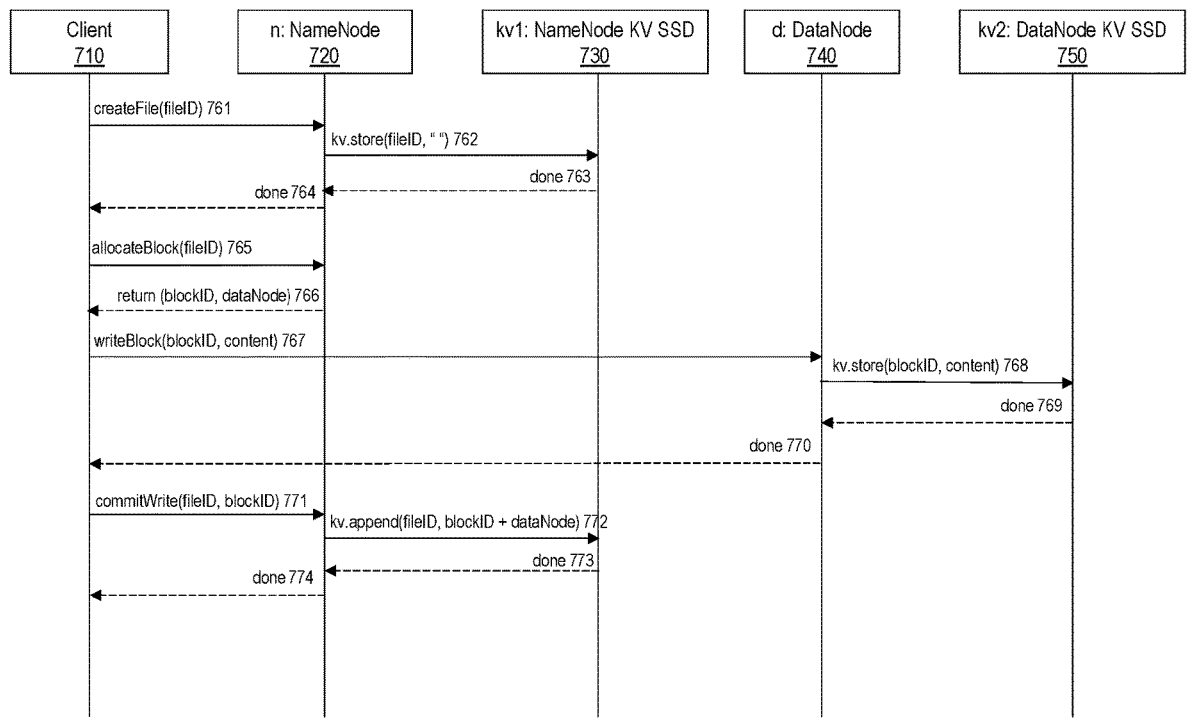
FIG. 7 shows an example process of creating and storing a file in a KV SSD of a distributed file system, according to one embodiment.
Figure 8:
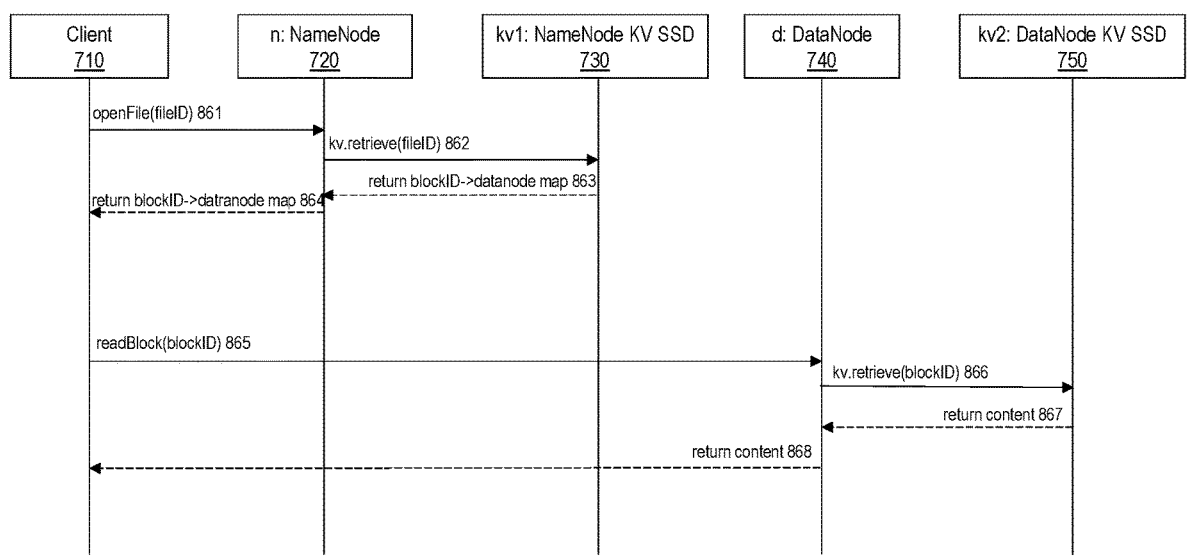
FIG. 8 shows an example process of reading a file stored in a KV SSD of a distributed file system, according to one embodiment.
Figure 9:
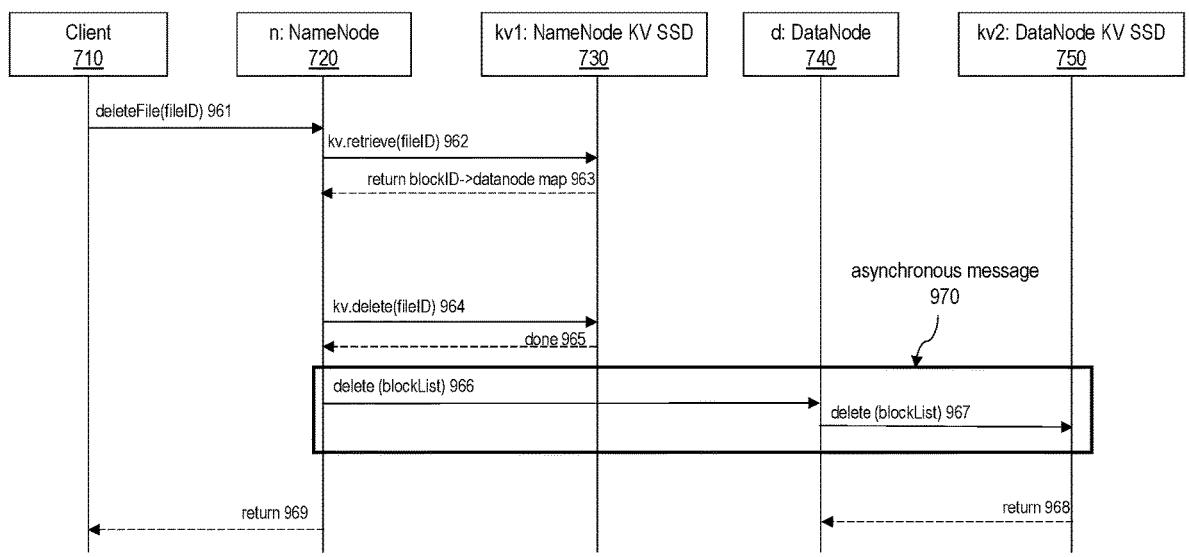
FIG. 9 shows an example process of deleting a file in a KV SSD of a distributed file system, according to one embodiment.

FIGS. 7, 8, and 9 shows diagrams showing example I/O processes for creating and writing a file, reading a file, and deleting a file in a distributed file system such as HDFS. In the description of each diagram, differences and advantages over prior processes will be discussed.

FIG. 7 shows an example process of creating and storing a file in a KV SSD of a distributed file system, according to one embodiment. The distributed file system includes a client 710, a name node (or metadata node) 720 including a KV SSD (kv1) 730, and a data node 740 including a KV SSD (kv2) 750. To create a new file, the client 710 sends a request 761 (createFile(fileID)) with a file ID (fileID) to the name node 720. The name node 720 registers the file ID internally and stores the file ID in the KV SSD 730 as a value-less key of a key-value pair by sending a key-value store command 762 (kv.store(fileID, " ")). The KV SSD 730 responds by sending a done message 763 back to the name node 720, and subsequently the name node 720 responds back to the client 710 with a done message 764. After the name node 720 responds back to the client 710, the client 710 an allocate command 765 to allocate a block for the file (allocateBlock(fileID)). In response, the name node 720 assigns a block ID (blockID) and a data node (e.g., the data node 740) to store the block and sends a response 766 back to the client 710. The name node 720 may assign a monotonically increasing ID as the block ID. The client 710 uses the block ID to send a block write request 767 (writeBlock (blockID, content)) with data content of the block to the data node 740. In response to the block write request 767, the data node 740 issues a key-value store command 768 (kv.store(blockID, content)) to the KV SSD 750 with the passed-in arguments the blockID, and the content. In a traditional data node with a normal SSD, the write operation on the data node would require writing to a file system and then to the underlying data storage medium of the SSD. After storing the block, the KV SSD 750 responds to the data node 740 with a done message 768, and the data node 740 responds to the client 710 with a done message 770. The client 710 then sends a commit write command 771 (commit (Write(fileID, blockID)) to the name node 720 to commit the block ID and the data node tuple to the associated file. The name node 720 sends an append command 772 (kv.append (fileID, blockID+dataNode) to the KV SSD 730. In the appending process, the append command 772 is a single direct operation to the KV SSD 730, not a memory operation to two separate maps (i.e., the file-block map and the block-datanode map) as in a traditional distributed storage system.

FIG. 8 shows an example process of reading a file stored in a KV SSD of a distributed file system, according to one embodiment. To read a file stored in the data node 740, the client 710 sends a read file request 861 (openFile(fileID)) with a file ID (fileID) to the name node 720. Using the file ID, the name node 720 sends a retrieve command (kv.retrieve(fileID) to the KV SSD 730, and the KV SSD 730 returns the mapping information 863 that maps the block(s) to the data node associated with the file ID. The name node 720 forwards the mapping information 864 to the client 710. Using the block ID included in the block-datanode mapping information, the client 710 sends a block read command 865 (readBlock(blockID)) to the data node 740. The data node 740 sends a block retrieve command 866 (kv.retrieve (blockID)) to the KV SSD 750 to retrieve the block content. The KV SSD 750 sends the content 867 of the requested block back to the data node 740, and the data node 740 forwards the retrieved block content 868 back to the client 710. The fundamental difference between a traditional reading operation is that the name node 720 issues a single direct KV SSD read operation to retrieve the block-datanode map, rather than searching an in-memory hash table for the file to block list and block to datanode list. In addition, the data node 740 sends a request for retrieving data directly to the KV SSD, bypassing any storage software middleware (such as a file system).

FIG. 9 shows an example process of deleting a file in a KV SSD of a distributed file system, according to one embodiment. The client 710 sends a file delete command 961 (deleteFile(fileID)) with a file ID to the name node 720. The name node 720 sends a key-value retrieve command 962 (kv.retrieve(fileID)) to the KV SSD 730 to retrieve the mapping information of the file, and the KV SSD 730 returns the mapping information 963 that maps the block(s) to the data node associated with the file ID. The name node 720 may temporarily cache the block ID mapping for a subsequent asynchronous deletion process for the associated block(s). The name node 720 sends a key-value delete command 964 (kv.delete(fileID)) to the KV SSD 730, and the KV SSD 730 sends a done message 965 to the name node 720 after deleting the file ID and the associated mapping. When retrieving the mapping information associated with the file ID, the name node 720 retrieves the block-datanode tuples for the to-be deleted file from the KV SSD 730. This process differs from the traditional distributed storage system that would involve looking up multiple in-memory hash tables. Instead, the name node 720 deletes this file-based key from the KV SSD 730 that contains the block-datanode map. The name node 720 returns the control back to the client 710, and the name node 720 asynchronously sends block delete commands to the data node 740 to delete the corresponding blocks from the KV SSD 750. It is noted that the file deletion process shown in FIG. 9 is based on the assumption that the distributed file system's block size is equal to or divisible into an erase block size of the KV SSD 750. This can minimize the overhead of moving from in-memory operations to KV SSD-based operations.

According to one embodiment, a solid-state drive (SSD) includes: a plurality of data blocks; a plurality of flash channels and a plurality of ways to access the plurality of data blocks; and an SSD controller that configures a block size of the plurality of data blocks. A data file is stored in the SSD with one or more key-values pairs, and each key-value pair has a block identifier as a key and a block data as a value. A size of the data file is equal to the block size or a multiple of the block size.

The SSD may be used in a distributed file system including Hadoop Distributed File System (HDFS).

The SSD controller may further configure to enable or disable block updates based on a block update flag.

The SSD controller may further configure to align the data file with the plurality of data blocks based on an alignment flag.

The block size may be determined based on an erase unit of the SSD multiplied by a number of flash channels.

The block size may be determined based on an erase unit of the SSD multiplied by a number of ways.

The block size may be equal to an erase unit of the SSD.

The SSD may store a file mapping table including a first mapping of the file to one or more data blocks of the plurality of data blocks associated with the file, and a second mapping of at least one of the one or more data blocks to a data node including the SSD.

According to another embodiment, a distributed data storage system includes: a client; a name node including a first key-value (KV) solid-state drive (SSD); and a data node including a second KV SSD, wherein the second KV SSD includes a plurality of data blocks, a plurality of flash channels and a plurality of ways to access the plurality of data blocks, and an SSD controller that configures a block size of the plurality of data blocks. The client sends a create file request including a file identifier to store a data file to the name node and send an allocate command to the name node to allocate one or more data blocks of the plurality of data blocks associated with the data file. The name node returns a block identifier of the one or more data blocks and a data node identifier of the data node that is assigned to store the one or more data blocks to the client. The client sends a block store command to the data node to store the one or more data blocks. The second KV SSD stores the one or more data blocks as key-values pairs, and at least one key-value pair has the block identifier as a key and a block data as a value. A size of the data file is equal to the block size or a multiple of the block size.

The distributed data storage system may employ Hadoop Distributed File System (HDFS).

The second KV SSD may store a file mapping table including a first mapping of the data file to one or more data blocks associated with the file, and a second mapping of at least one of the one or more data blocks to a data node.

According to yet another embodiment, a method includes: sending a create file request from a client to a name node, wherein the create file request includes a file identifier to store a data file; storing the file identifier as a key-value pair in a first key-value (KV) solid-state drive (SSD) of the name node, wherein the file identifier is stored in the key-value as a key, and a value associated with the key is empty; sending an allocate command from the client to the name node to allocate one or more data blocks associated with the data file; assigning, at the name node, a block identifier to at least one of the one or more data blocks and assigning a data node to store the one or more data blocks; returning the block identifier and a data node identifier of the data node from the name node to the client; sending a write block request from the client to the data node, wherein the write block request includes the block identifier and content; and saving the one or more data blocks in a second KV SSD of the data node as key-value pairs. The second KV SSD of the data node includes one or more data blocks having a block size. At least one key-value pair has a block identifier as a key and a block data as a value. A size of the data file is equal to the block size or a multiple of the block size.

The client, the name node, and the data node may be nodes in a Hadoop Distributed File System (HDFS).

The method may further include setting a block update flag to enable or disable block updates.

The method may further include setting an alignment flag to align the data file with the plurality of data blocks of the second KV SSD of the data node.

The method may further include: sending a write commit command from the client to the name node including the file identifier and the block identifier; and appending a single direct operation to append the file identifier, the block identifier, and the data node in the name node.

The method may further include: sending a read file request to read the data file from the client to the name node; returning the block identifier and the data node identifier for at least one of the one or more data blocks associated with the data file to the client; sending a block read command from the client to the data node to retrieve the one or more data blocks stored in the second KV SSD of the data node; and returning the block data identified by the block identifier from the data node to the client.

The method may further include: sending a file delete command from the client to the name node including the file identifier; returning the block identifier and the data node identifier for at least one of the one or more data blocks associated with the data file to the client; sending a key-value delete command including the file identifier of the data file from the name node to the first KV SSD of the name node; sending a block delete command from the name node to the data node including a list of the one or more data blocks; and deleting the one or more data blocks stored in the second KV SSD of the data node.

The second KV SSD may store a file mapping table including a first mapping of the file to one or more data blocks associated with the file, and a second mapping of at least one of the one or more data blocks to the data node.

The above example embodiments have been described hereinabove to illustrate various embodiments of implementing a system and method for providing a system and method for leveraging key-value storage to efficiently store data and metadata in a distributed file system. Various modifications and departures from the disclosed example embodiments will occur to those having ordinary skill in the art. The subject matter that is intended to be within the scope of the present disclosure is set forth in the following claims.

What is claimed is:

1. A solid-state drive (SSD) comprising:
a data block including a key-value pair; and
an SSD controller that determines a block size of the data block,
wherein the SSD stores a data file in at least one data block,
wherein a size of the data file is equal to the block size or a multiple of the block size,
wherein the data file is retrievable by looking up a file mapping table,
wherein the file mapping table includes an entry of the data file, the entry corresponding to the data file including a file identifier of the data file, a block identifier corresponding to the at least one data block, and a node identifier corresponding to the block identifier, and
wherein a sum of the block identifier and the node identifier is stored as a key of a first key-value pair, and the at least one data block of the data file is stored as a value of the first key-value pair.

2. The SSD of claim 1, wherein the file identifier is stored as a key of a value-less key-value pair.

3. The SSD of claim 1, wherein the SSD controller enables or disables block updates based on a block update flag.

4. The SSD of claim 1, wherein the SSD controller aligns the data file with the at least one data block based on an alignment flag.

5. The SSD of claim 1, wherein the block size is determined based on a size of an erase unit of the SSD multiplied by a number of flash channels.

6. The SSD of claim 1, wherein the block size is determined based on a size of an erase unit of the SSD multiplied by a number of ways.

7. The SSD of claim 1, wherein the block size is equal to a size of an erase unit of the SSD.

8. The SSD of claim 1, wherein the a file mapping table includes a first mapping of the data file to the at least one data block, and a second mapping of the at least one data block to a data node including the SSD.

9. A distributed data storage system comprising:
a client;
a name node comprising a first key-value (KV) solid-state drive (SSD); and
a data node comprising a second KV SSD, wherein the second KV SSD comprises a data block including a key-value pair, and an SSD controller that determines a block size of the data block,
wherein the client sends a create file request including a file identifier to store a data file to the name node and send an allocate command to the name node to allocate the at least one data block,
wherein the name node returns a block identifier of the at least one data block and the node identifier of the data node that is assigned to store the at least one data block to the client,
wherein the client sends a block store command to the data node to store the at least one data block,
wherein the second KV SSD stores the data file in the at least one data block,
wherein a size of the data file is equal to the block size or a multiple of the block size,
wherein the client is capable of retrieving the data file by looking up a file mapping table,
wherein the file mapping table includes an entry of the data file, the entry corresponding to the data file including a file identifier of the data file, the block identifier corresponding to the at least one data block, and the node identifier corresponding to the block identifier, and
wherein a sum of the block identifier and the node identifier is stored in the first KV SSD as a key of a first key-value pair, and the at least one data block of the data file is stored as a value of the first key-value pair.

10. The distributed data storage system of claim 9, wherein the client, the name node, and the data node are nodes are distributed nodes in the distributed data storage system.

11. The distributed data storage system of claim 9, wherein the second KV SSD stores the file mapping table including a first mapping of the data file to the at least one data block, and a second mapping of the at least one data block to the data node.

12. A method comprising:
sending a create file request from a client to a name node, wherein the create file request includes a file identifier to store a data file;

storing the file identifier as a key-value pair in a first key-value (KV) solid-state drive (SSD) of the name node, wherein the file identifier corresponds to a key of the key-value pair, and a value of the key-value pair is empty;

sending an allocate command from the client to the name node to allocate at least one data block;

assigning, at the name node, a block identifier to the least one data block and assigning a data node to store the at least one data block;

storing an entry of the data file in a file mapping table, wherein the entry corresponding to the data file includes a file identifier of the data file, the block identifier corresponding to the at least one data block, and a node identifier corresponding to the block identifier, returning the block identifier and the node identifier of the data node from the name node to the client;

sending a write block request from the client to the data node, wherein the write block request includes the block identifier and content; and saving the at least one data block in a second KV SSD of the data node as key-value pairs, wherein the second KV SSD of the data node comprises the at least one data block having a block size, wherein a size of the data file is equal to the block size or a multiple of the block size, wherein the client is capable of retrieving the data file by looking up the file mapping table, and wherein a sum of the block identifier and the node identifier is stored in the first KV SSD as a key of a first key-value pair, and the at least one data block of the data file is stored as a value of the first key-value pair.

13. The method of claim 12, the client, the name node, and the data node are distributed nodes in a distributed data storage system.

14. The method of claim 12, further comprising setting a block update flag to enable or disable block updates.

15. The method of claim 12, further comprising setting an alignment flag to align the data file with the at least one data block of the second KV SSD of the data node.

16. The method of claim 12, further comprising:
sending a write commit command from the client to the name node including the file identifier and the block identifier; and
appending a single direct operation to append the file identifier, the block identifier, and the data node in the name node.

17. The method of claim 16, further comprising:
sending a read file request to read the data file from the client to the name node;
returning the block identifier and the node identifier for the at least one data block to the client;
sending a block read command from the client to the data node to retrieve the at least one data block stored in the second KV SSD of the data node; and
returning the block data identified by the block identifier from the data node to the client.

18. The method of claim 17, further comprising:
sending a file delete command from the client to the name node including the file identifier;
returning the block identifier and the data node identifier for the at least one data block to the client;
sending a key-value delete command including the file identifier of the data file from the name node to the first KV SSD of the name node;
sending a block delete command from the name node to the data node including a list of the at least one data block; and
deleting the at least one data block stored in the second KV SSD of the data node.

19. The method of claim 12, wherein the file mapping table includes a first mapping of the data file to the at least one data block, and a second mapping of the at least one data block to the data node.

* * * * *